US012502887B2

(12) United States Patent
Matsufuji et al.

(10) Patent No.: US 12,502,887 B2
(45) Date of Patent: Dec. 23, 2025

(54) DISCHARGE HEAD, DISCHARGE UNIT, AND LIQUID DISCHARGE APPARATUS

(71) Applicants: Ryohta Matsufuji, Kanagawa (JP); Kiyoshi Amari, Kanagawa (JP); Ryo Honda, Kanagawa (JP); Keitaroh Sakai, Kanagawa (JP)

(72) Inventors: Ryohta Matsufuji, Kanagawa (JP); Kiyoshi Amari, Kanagawa (JP); Ryo Honda, Kanagawa (JP); Keitaroh Sakai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 164 days.

(21) Appl. No.: 17/791,553

(22) PCT Filed: Mar. 16, 2021

(86) PCT No.: PCT/IB2021/052151

§ 371 (c)(1),
(2) Date: Jul. 8, 2022

(87) PCT Pub. No.: WO2021/191728

PCT Pub. Date: Sep. 30, 2021

(65) Prior Publication Data

US 2022/0379609 A1 Dec. 1, 2022

(30) Foreign Application Priority Data

Mar. 23, 2020 (JP) ................................ 2020-050474
Oct. 9, 2020 (JP) ................................ 2020-171568

(51) Int. Cl.
*B41J 2/14* (2006.01)

(52) U.S. Cl.
CPC ........ *B41J 2/14201* (2013.01); *B41J 2202/05* (2013.01); *B41J 2202/12* (2013.01)

(58) Field of Classification Search
None
See application file for complete search history.

(56) References Cited

U.S. PATENT DOCUMENTS 4,628,330 A 12/1986 Suga et al.
4,943,004 A * 7/1990 Takahashi ............. F02M 59/36 239/128

(Continued)

FOREIGN PATENT DOCUMENTS

JP S63-303750 12/1988
JP 2000-506590 A 5/2000

(Continued)

OTHER PUBLICATIONS

Office Action issued Jun. 30, 2023 in Chinese Patent Application No. 202180022453.2, 7 pages.

(Continued)

*Primary Examiner* — Alejandro Valencia
(74) *Attorney, Agent, or Firm* — XSENSUS LLP

(57) ABSTRACT

A discharge head includes a nozzle, a valve body, a piezoelectric element, and a first biasing unit. The nozzle is configured to discharge liquid. The valve body is configured to open and close the nozzle. The piezoelectric element is configured to drive the valve body. The first biasing unit is disposed in parallel with the piezoelectric element. The piezoelectric element is configured to drive the valve body in a direction to open the nozzle when a voltage is applied to the piezoelectric element. The first biasing unit is configured to bias the valve body in the direction to open the nozzle.

17 Claims, 18 Drawing Sheets

(56) References Cited

U.S. PATENT DOCUMENTS

| | | | | |
|---|---|---|---|---|
| 6,749,126 | B1 * | 6/2004 | Ruehle | F02M 51/0603 239/102.1 |
| 6,889,913 | B2 * | 5/2005 | Ruehle | F02M 51/0603 239/102.1 |
| 7,258,283 | B2 * | 8/2007 | Heinz | F02M 51/0603 239/96 |
| 10,618,062 | B2 * | 4/2020 | Nakamura | B05B 17/0607 |
| 2018/0085777 | A1 | 3/2018 | Sakai et al. | |
| 2019/0217614 | A1 | 7/2019 | Kaiba et al. | |
| 2019/0222146 | A1 * | 7/2019 | Mangeot | H02N 2/006 |
| 2020/0039217 | A1 | 2/2020 | Kaiba et al. | |

FOREIGN PATENT DOCUMENTS

| | | | |
|---|---|---|---|
| JP | 2004-142382 | | 5/2004 |
| JP | 2004-305791 | | 11/2004 |
| JP | 2006-198608 | A | 8/2006 |
| JP | 2008-008356 | | 1/2008 |
| JP | 2010-241003 | | 10/2010 |
| JP | 2011-230122 | | 11/2011 |
| JP | 2015-051399 | | 3/2015 |
| JP | 2016-159501 | | 9/2016 |
| JP | 2017-164703 | | 9/2017 |
| JP | 2018-015978 | A | 2/2018 |
| JP | 2018-051479 | A | 4/2018 |
| JP | 2019-122955 | | 7/2019 |
| JP | 2020-023177 | | 2/2020 |

OTHER PUBLICATIONS

International Search Report issued on May 20, 2021 in PCT/IB2021/052151 filed on Mar. 16, 2021, 9 pages.

Office Action issued May 7, 2024 in corresponding Japanese Patent Application No. 2020-171568.

* cited by examiner

DISCHARGE HEAD, DISCHARGE UNIT, AND LIQUID DISCHARGE APPARATUS

CROSS-REFERENCE TO RELATED APPLICATIONS

The present application is based on PCT filing PCT/IB2021/052151, filed Mar. 16, 2021, which claims priority to Japanese Patent Application No. 2020-050474, filed Mar. 23, 2020 and Japanese Patent Application No. 2020-171568 filed Oct. 9, 2020, the entire contents of each of which is incorporated herein by reference.

TECHNICAL FIELD

Embodiments of the present disclosure relate to a liquid discharge head, a discharge unit, and a liquid discharge apparatus.

BACKGROUND ART

As a discharge head that discharges liquid, there is a discharge head that supplies pressurized liquid in a liquid chamber communicated with a nozzle and drive a valve body, which opens and closes the nozzle, to discharge the liquid from the nozzle.

There is known a liquid discharge apparatus that includes a storage chamber and a discharge mechanism. The storage chamber is communicated with a discharge port and contains liquid. The discharge mechanism discharges the liquid from the storage chamber through the discharge port. The discharge mechanism includes a valve body and a drive unit. The valve body reciprocates between a first position away from the discharge port and a second position at which the valve body contacts a peripheral edge portion of the discharge port to close the discharge port. The drive unit includes a biasing member and a piezoelectric element to apply a drive force to the valve body to reciprocate the valve body. The drive unit causes the valve body to move from the first position to the second position, thereby pushing out the liquid in the storage chamber to the discharge port and discharging the liquid from the discharge port (see patent literature (PTL) 1).

CITATION LIST

Patent Literature

[PTL 1]
Japanese Unexamined Patent Application Publication No. 2017-164703

SUMMARY OF INVENTION

Problems to be Solved

However, in the configuration disclosed in PTL 1, when an abnormality occurs in the piezoelectric element, there is a problem in that intended liquid discharge may not be performed and image quality is reduced.

The present disclosure has been made in view of the above-described problem, and an object of the present disclosure is to perform intended liquid discharge even when an abnormality occurs in a piezoelectric element, and to prevent a reduction in image quality.

Solution to Problem

In an aspect of the present disclosure, there is provided a discharge head that includes a nozzle configured to discharge a liquid; a valve body configured to open and close the nozzle; a piezoelectric element configured to drive the valve body; and a first biasing unit disposed in parallel with the piezoelectric element. The piezoelectric element is configured to drive the valve body in a direction to open the nozzle when a voltage is applied to the piezoelectric element. The first biasing unit is configured to bias the valve body in the direction to open the nozzle.

Advantageous Effects of Invention

According to the present disclosure, even when an abnormality occurs in a piezoelectric element, intended liquid discharge can be performed and a reduction in image quality can be prevented.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
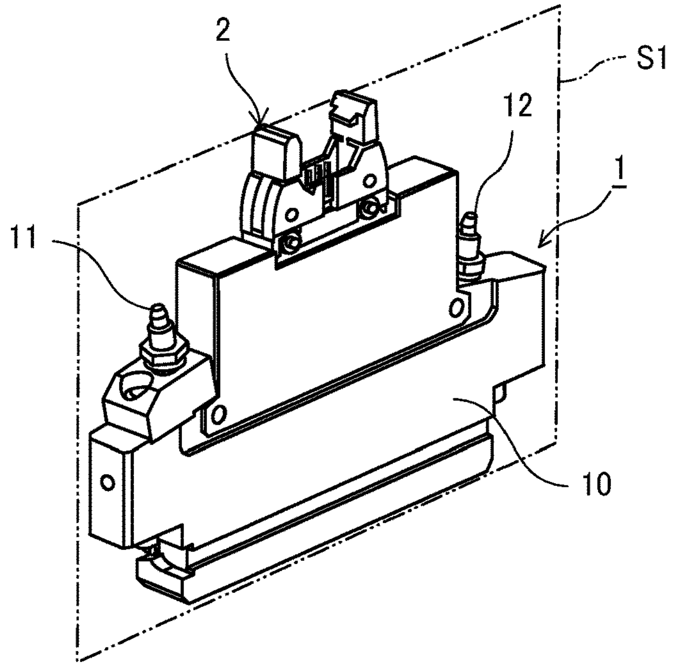
FIG. 1 is an external perspective view of a discharge head according to a first embodiment of the present disclosure.
Figure 2:
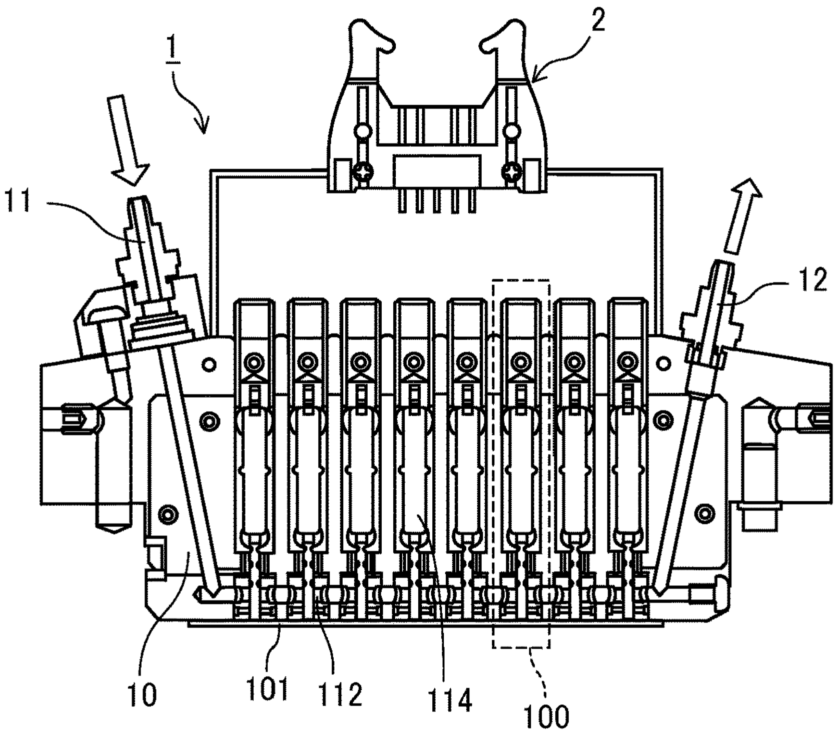
FIG. 2 is a cross-sectional view of the discharge head taken along a cross section S1 of FIG. 1.
Figure 3:
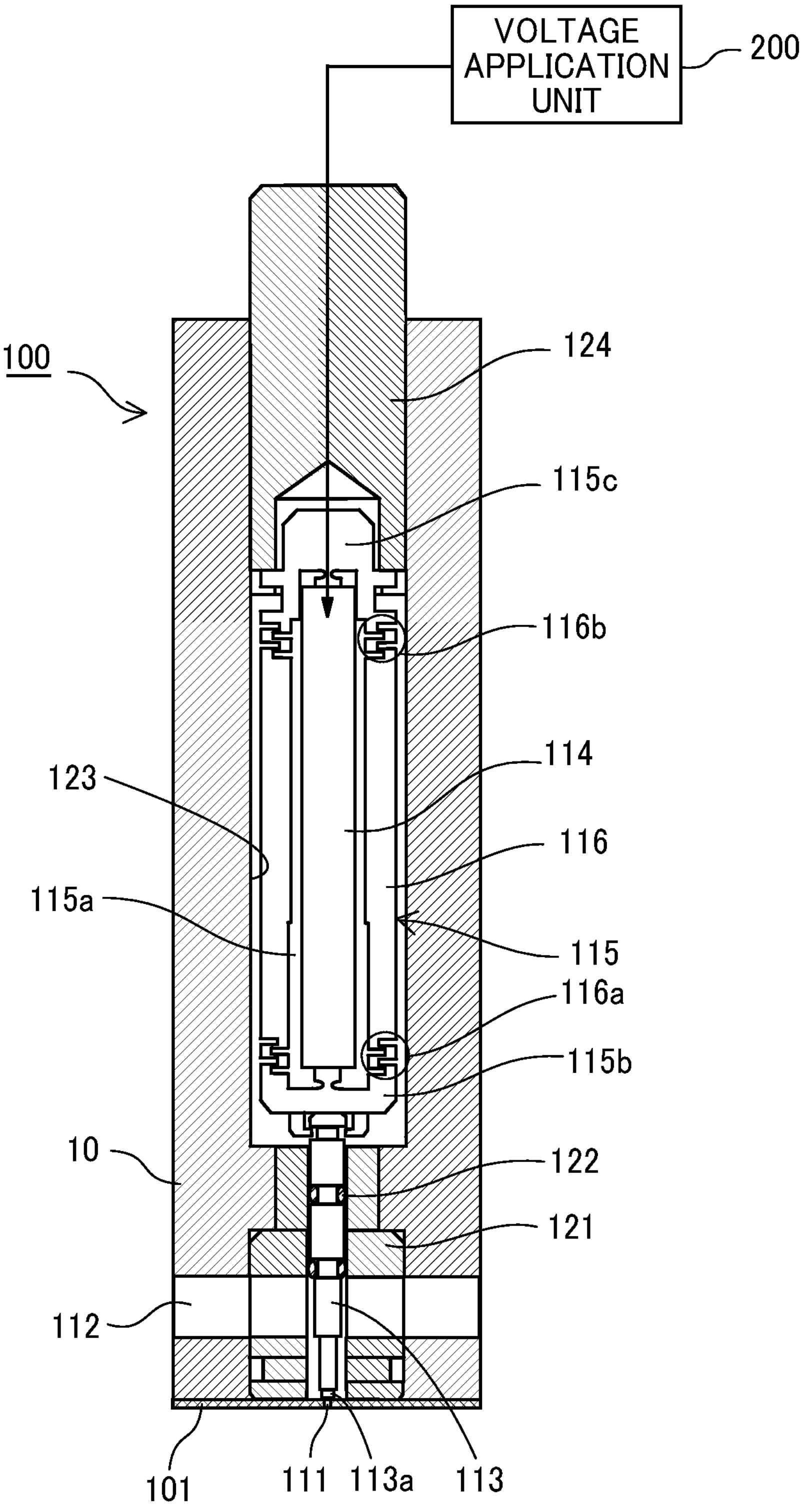
FIG. 3 is a cross-sectional view of one discharge module of the discharge head of FIG. 1.
Figure 4:
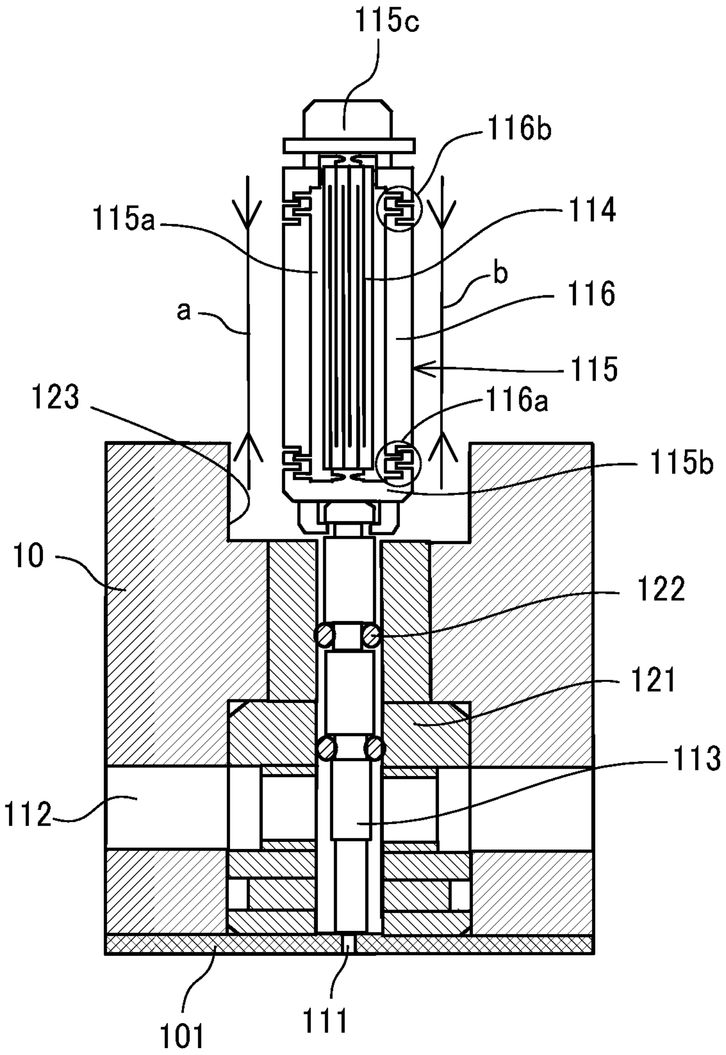
FIG. 4 is an enlarged cross-sectional view of a main part of the discharge module of FIG. 3.
Figure 5:
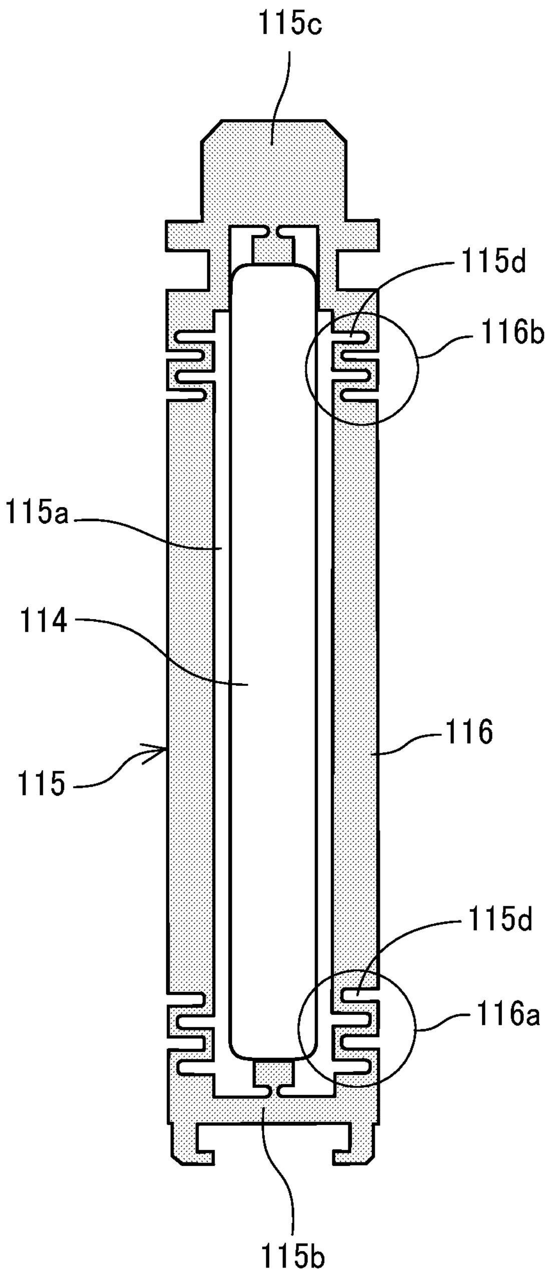
FIG. 5 is an enlarged view of a holding member of the discharge module of FIG. 3.

Referring now to the drawings, wherein like reference numerals designate identical or corresponding parts throughout the several views, exemplary embodiments of the present disclosure are described below. A first embodiment of the present disclosure is described with reference to FIGS. 1 to 5. FIG. 1 is an external perspective view of a discharge head according to the first embodiment. FIG. 2 is a cross-sectional view of the of a discharge head taken along a cross section S1 of FIG. 1. FIG. 3 is a cross-sectional view of one discharge module of the discharge head. FIG. 4 is an enlarged cross-sectional view of a main part of the discharge module of FIG. 3. FIG. 5 is an enlarged view of a holding member of the discharge module of FIG. 3.

A discharge head 1 includes a plurality of discharge modules 100 arranged in one row or a plurality of rows in a housing 10. Pressurized liquid is supplied to each discharge module 100 from the outside via a supply port 11, and liquid that is not discharged is collected to the outside via a collection port 12. The housing 10 is provided with a connector 2.

The discharge module 100 includes a nozzle plate 101, a channel 112, a valve body 113, and a piezoelectric element 114. A nozzle 111 that discharges liquid is formed in the nozzle plate 101. The channel 112 is communicated with the nozzle 111, and pressurized liquid is supplied to the channel 112. The valve body 113 has a needle-shape and opens and closes the nozzle 111. The piezoelectric element 114 drives the valve body 113.

The nozzle plate 101 and the housing 10 are bonded together. The channel 112 is a channel common to the plurality of discharge modules 100 formed in the housing 10. As described above, the pressurized liquid is supplied through the supply port 11, and the liquid is collected from the collection port 12.

An elastic body 113*a* is provided at a tip end portion of the valve body 113 and reliably closes the nozzle 111 when the elastic body 113*a* is pressed against the nozzle plate 101. A bearing portion 121 is provided between the valve body 113 and the housing 10, and a seal member 122 such as an O-ring is provided between the bearing portion 121 and the valve body 113.

The piezoelectric element 114 is accommodated in a piezoelectric-element housing space 123 of the housing 10. The piezoelectric element 114 is held in a central space 115*a* of a holding member 115 also serving as a first biasing unit. The piezoelectric element 114 and the valve body 113 are coaxially coupled to each other via a front end portion 115*b* of the holding member 115.

The holding member 115 has the central space 115*a* to accommodate the piezoelectric element 114. A front end portion 115*b* side of the holding member 115 is coupled to the valve body 113, and a rear end portion 115*c* side of the holding member 115 is fixed by a piezoelectric-element fixing shaft 124 attached to the housing 10.

The holding member 115 includes a holding plate spring 116 as a first biasing unit. The holding plate spring 116 has elastically deformable spring portions 116*a* and 116*b* at both ends in the longitudinal direction corresponding to an expansion/contraction direction of the piezoelectric element 114. The spring portion 116*a* is on the front end portion 115*b* side to which the valve body 113 is attached, and the spring portion 116*b* is on the rear end portion 115*c* side opposite to the front end portion 115*b* side to which the valve body 113 is attached.

On the both ends of the holding plate spring 116, slits 115*d* are provided alternately from a short direction orthogonal to the longitudinal direction so that the spring portions 116*a* and have in a crank shape. Thus, the spring portions 116*a* and 116*b* have a spring function. In the present embodiment, the spring constants of the spring portions 116*a* and 116*b* are substantially the same (including the same).

The length of the central space 115*a* of the holding member 115 in the axial direction of the valve body 113 is shorter than the length of the piezoelectric element 114 in the axial direction of the valve body 113. Accordingly, when the piezoelectric element 114 is fitted into the central space 115*a* of the holding member 115, the spring portions 116*a* and 116*b* of the holding plate spring 116 are extended.

As a result, when the piezoelectric element 114 contracts in a direction indicated by arrow a in FIG. 4, the holding plate spring 116 also contracts in a direction indicated by arrow b in FIG. 4. Thus, a biasing force of pulling the valve body 113 in a direction to open the nozzle 111 acts on the valve body 113.

Here, the piezoelectric element 114 operates in the D31 mode when a voltage is applied by a voltage application unit 200, and drives the valve body 113 in the direction to open the nozzle 111. In other words, applying a voltage to the piezoelectric element 114 causes the valve body 113 to be driven in the direction to open the nozzle 111.

Accordingly, when no voltage is applied to the piezoelectric element 114, the valve body 113 closes the nozzle 111. Thus, even if the pressurized liquid is supplied to the channel 112, the liquid is not discharged from the nozzle 111.

When a voltage is applied to the piezoelectric element 114, the piezoelectric element 114 contracts and pulls the valve body 113 via the holding member 115, so that the valve body 113 is separated from the nozzle 111 to open the nozzle 111. Accordingly, the pressurized liquid supplied to the channel 112 is discharged from the nozzle 111.

Next, an operation and effect of the present embodiment is described.

First, as a comparative example, a case is described in which a piezoelectric element that drives the valve body 113 operates in a D33 mode in which the piezoelectric element extends in a direction in which the valve body 113 is closed when a voltage is applied.

When the piezoelectric element operates in the D33 mode, the valve body 113 is pressed against and closes the nozzle 111 in a state in which a voltage is applied. When the liquid is discharged, the application of the voltage to the piezoelectric element is stopped or the voltage is lowered to move the valve body 113 in the opening direction to open the nozzle 111.

The D33 mode of the piezoelectric element has the advantages of high responsiveness and large amount of displacement, and has high responsiveness of the opening and closing operation of the valve body 113, thus allowing small variations in droplet speed and droplet amount of the liquid discharged from the nozzle 111.

However, when functional deterioration due to migration or the like occurs in the piezoelectric element and the extended state cannot be maintained even when a voltage is applied, the valve body 113 moves to the open position and the nozzle 111 is opened. Accordingly, since the pressurized liquid is supplied to the channel 112, the liquid is constantly discharged.

In the present embodiment, since the piezoelectric element 114 is configured to operate in the D31 mode, the valve body 113 is held at the position at which the valve body 113 closes the nozzle 111, when no voltage is applied.

When a voltage is applied to the piezoelectric element 114, the piezoelectric element 114 contracts, the valve body 113 opens, and the liquid is discharged from the nozzle 111.

Therefore, even if functional deterioration due to migration or the like occurs in the piezoelectric element 114, the valve body 113 does not move to the position at which the nozzle 111 is opened, and thus the liquid s not constantly discharged.

Here, when the piezoelectric element 114 is operated in the D31 mode, the responsiveness and the displacement amount are lower than those in the case in which the piezoelectric element is operated in the D33 mode. Accordingly, the opening-and-closing responsiveness of the valve body 113 is lowered, which may increase variations in the discharge characteristics.

Therefore, in the present embodiment, the piezoelectric element 114 is held by the holding member 115 having the first biasing unit (the holding plate spring 116 in the present embodiment) parallel to the piezoelectric element 114. In other words, the first biasing unit that biases the valve body 113 in the direction to open the nozzle 111 is provided in parallel with the piezoelectric element 114.

Accordingly, when a voltage is applied to the piezoelectric element 114 to contract the piezoelectric element 114 and move the valve body 113 in a direction to open the nozzle 111, the movement of the valve body 113 to the open position is assisted by the contraction of the holding plate spring 116.

Therefore, the force for moving the valve body 113 is increased, the responsiveness of the opening movement of the nozzle 111 by the valve body 113 is enhanced, and the variation in discharge characteristics is reduced.

On the other hand, when a biasing member such as a spiral spring is arranged in series with the piezoelectric element 114, the movement of the biasing member is independent of the movement of the piezoelectric element. Therefore, there is a disadvantage that, when free vibrations occur, some vibrations in a direction in which movement of the piezoelectric element is inhibited are also generated.

In the present embodiment, the piezoelectric element and the first biasing unit are arranged in parallel. Accordingly, the spring force (biasing force) is generated depending on the shape of the piezoelectric element, so that the movement (displacement) of the piezoelectric element and the biasing force can be fully synchronized and assisted.

Figure 6:
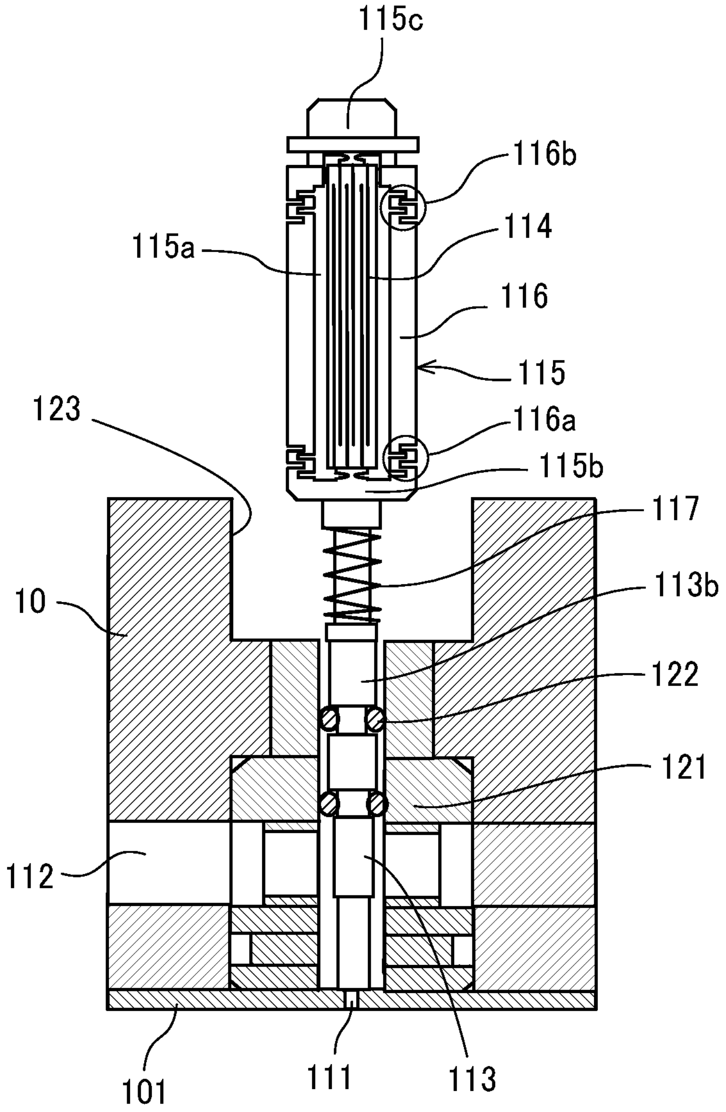
FIG. 6 is an enlarged cross-sectional view of a main part of a discharge module of a discharge head according to a second embodiment of the present disclosure.

Next, a second embodiment of the present disclosure is described with reference to FIG. 6. FIG. 6 is an enlarged cross-sectional view of a main part of a discharge module of a discharge head according to the second embodiment.

In the present embodiment, a compression spring 117 serving as a second biasing unit is disposed between a front end portion **115*b* of a holding member 115 and a shaft portion 113*b* of a valve body 113. Since the holding member 115 is fixed on a rear end portion 115*c* side, the biasing force of the compression spring 117 acts on the valve body 113 in the direction in which the valve body 113 closes the nozzle 111**.

Accordingly, when the application of the voltage to the piezoelectric element 114 is stopped and the valve body 113 moves in the direction in which the valve body 113 closes the nozzle 111, the movement of the valve body 113 to the closing position (i.e., the position at which the valve body 113 closes the nozzle 111) is assisted by the biasing force of the compression spring 117.

Thus, the force for moving the valve body 113 is increased, the responsiveness of the movement of the valve body 113 to the closed position is enhanced, and the variation in discharge characteristics is reduced.

Figure 7:
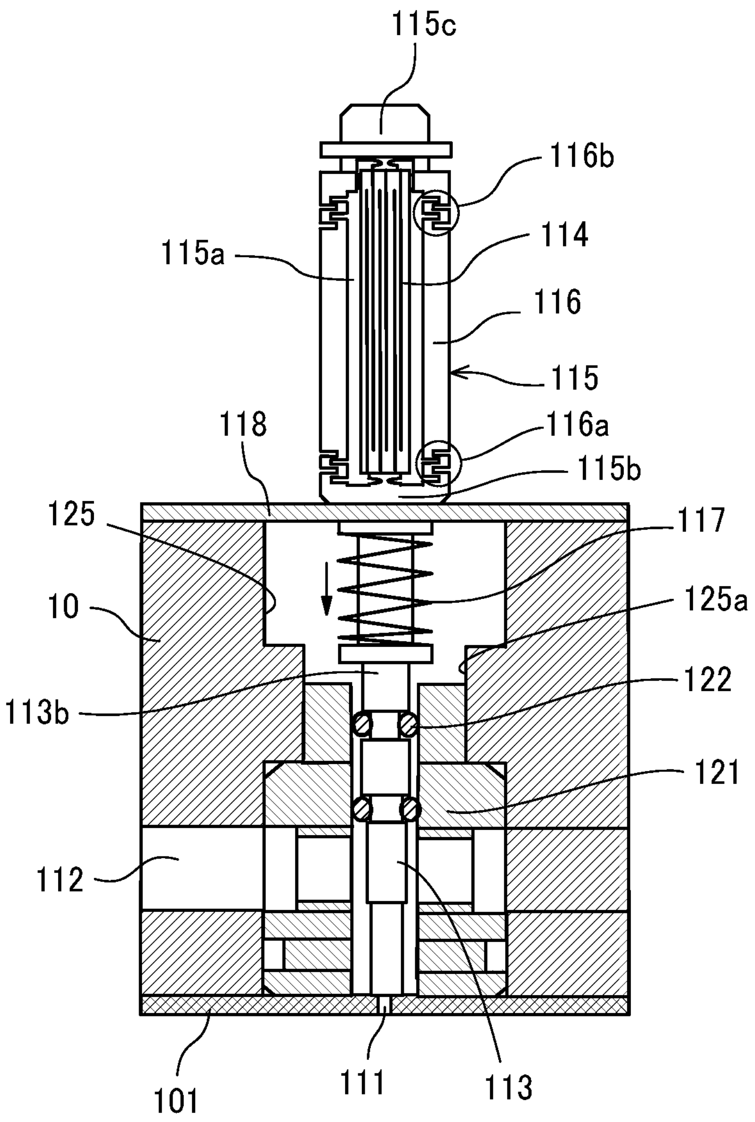
FIG. 7 is an enlarged cross-sectional view of a main part of a discharge module of a discharge head according to a third embodiment of the present disclosure.

Next, a third embodiment of the present disclosure is described with reference to FIG. 7. FIG. 7 is an enlarged cross-sectional view of a main part of a discharge module of a discharge head according to the third embodiment.

In the present embodiment, a displacement plate 118 is provided to partition a piezoelectric-element housing space 123 of a housing 10 and a space 125 on the side opposite to a channel 112 side of a bearing portion 121. The displacement plate 118 is disposed between a holding member 115 and a valve body 113 and is displaceable following the movement of the valve body 113 and the holding member 115.

With this configuration, even if pressurized liquid supplied to the channel 112 leaks to the piezoelectric element 114 side through a gap between the valve body 113 and the bearing portion 121 due to a sealing failure of a seal member 122 or the like, the pressurized liquid is prevented from entering the piezoelectric-element housing space 123.

Thus, even if liquid leaks, such a configuration can prevent leaked liquid from adhering to the piezoelectric element 114 and causing an operation failure of the piezoelectric element 114.

Figure 8:
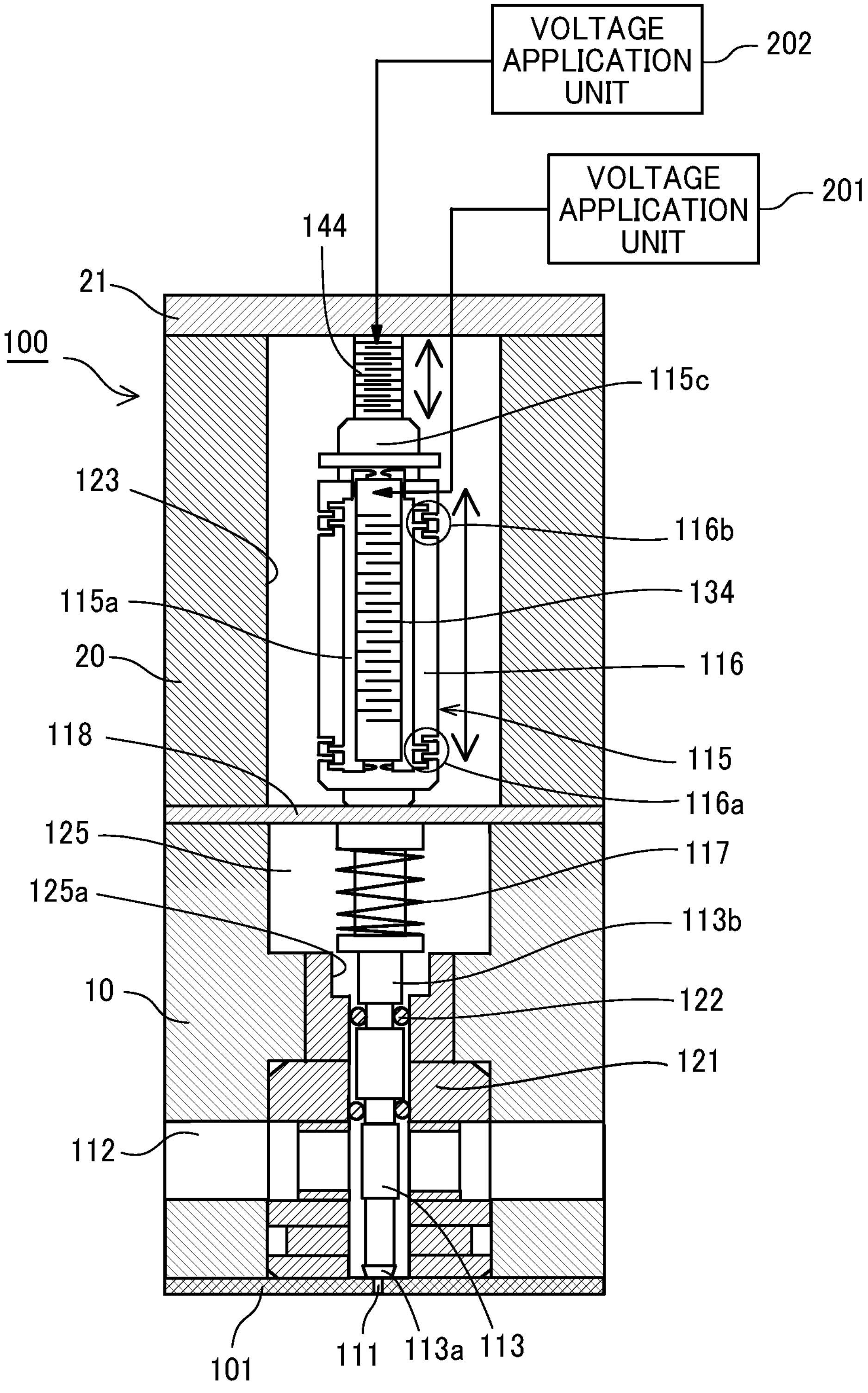
FIG. 8 is an enlarged cross-sectional view of a main part of a discharge module of a discharge head according to a fourth embodiment of the present disclosure.

Next, a fourth embodiment of the present disclosure is described with reference to FIG. 8. FIG. 8 is an enlarged cross-sectional view of a main part of a discharge module of a discharge head according to the fourth embodiment.

In the present embodiment, a plurality of discharge modules 100 are arranged to have a common casing including a housing 10, a frame member 20, and a base member 21. The housing 10 and the frame member 20 are coupled via a displacement plate 118, and the base member 21 is attached to an opening of the frame member 20.

The discharge module 100 includes a nozzle plate 101, a channel 112, a valve body 113, and a piezoelectric element 134. A nozzle 111 that discharges liquid is formed in the nozzle plate 101. The channel 112 supplies pressurized liquid to the nozzle 111. The valve body 113 has a needle-shape and opens and closes the nozzle 111. The piezoelectric element 134 drives the valve body 113.

The nozzle plate 101 and the housing 10 are bonded together. The channel 112 is a channel common to the plurality of discharge modules 100 formed in the housing 10.

An elastic body **113*a* is provided at a tip end portion of the valve body 113 and reliably closes the nozzle 111 when the elastic body 113*a* is pressed against the nozzle plate 101. A bearing portion 121 is provided between the valve body 113 and the housing 10, and a seal member 122 such as an O-ring is provided between the bearing portion 121 and the valve body 113**.

The piezoelectric element 134 is housed in a piezoelectric-element housing space 123 provided in the frame member 20. The piezoelectric element 134 is held in a central space 115*a* of a holding member 115 also serving as a first biasing unit. The piezoelectric element 134 and the valve body 113 are coaxially coupled to each other via a front end portion 115*b* of the holding member 115.

The holding member 115 has a central space 115*a* to accommodate the piezoelectric element 134. A front end portion 115*b* side of the holding member 115 is coupled to the valve body 113.

The holding member 115 includes a holding plate spring 116 as a first biasing unit. The holding plate spring 116 has elastically deformable spring portions 116*a* and 116*b*, as in the first embodiment, at both ends in the longitudinal direction corresponding to an expansion-and-contraction direction of the piezoelectric element 114.

The length of the central space 115*a* of the holding member 115 in the axial direction of the valve body 113 is shorter than the length of the piezoelectric element 134 in the axial direction of the valve body 113. Accordingly, when the piezoelectric element 134 is fitted into the central space 115*a* of the holding member 115, the spring portions 116*a* and 116*b* of the holding plate spring 116 are extended.

As a result, when the piezoelectric element 134 contracts, the holding plate spring 116 also contracts. Thus, a biasing force of pulling the valve body 113 in a direction to open the nozzle 111 acts on the valve body 113.

Here, the piezoelectric element 134 operates in the D33 mode when a voltage is applied by a voltage application unit 201, and drives the valve body 113 in a direction in which the nozzle 111 is closed. In other words, applying a voltage to the piezoelectric element 134 causes the valve body 113 to be driven in the direction in which the nozzle 111 is closed.

Therefore, in the present embodiment, a voltage is applied to the piezoelectric element 134 to extend the piezoelectric element 134, and the valve body 113 closes the nozzle 111. At this time, even when pressurized liquid is supplied to the channel 112, the liquid is not discharged from the nozzle 111.

When the voltage applied to the piezoelectric element 134 is stopped or lowered, the piezoelectric element 134 contracts and pulls the valve body 113 via the holding member 115, so that the valve body 113 is separated from the nozzle 111 to open the nozzle 111.

Accordingly, the pressurized liquid supplied to the channel 112 is discharged from the nozzle 111.

In the discharge module 100, the piezoelectric element 144 is disposed between the piezoelectric element 134 and the base member 21 via the holding member 115. The piezoelectric element 144 displaces the piezoelectric element 134 and the valve body 113 in a direction in which the nozzle 111 is closed.

If functional deterioration occurs in the piezoelectric element 134 due to migration or the like and cannot be held in an extended state even when a voltage is applied, a voltage from a voltage application unit 202 is applied to the piezoelectric element 144 to extend the piezoelectric element 144.

As a result, the piezoelectric element 134 and the valve body 113 move in the direction in which the piezoelectric element 134 and the valve body 113 close the nozzle 111 via the holding member 115. Thus, the nozzle 111 is closed with the valve body 113, thereby preventing the liquid from being constantly discharged.

As described above, in the present embodiment, the piezoelectric element 134 is operated in the D33 mode to obtain high responsiveness and discharge characteristics and prevent the constant discharge state.

A member that displaces the piezoelectric element 134 and the valve body 113 in the direction in which the valve body 113 closes the nozzle 111 is not limited to the piezoelectric element 144. For example, an actuator such as a solenoid may be used.

In addition, in the present embodiment, as described in the first to third embodiments, in a normal operation state, assistance can be performed by the holding plate spring 116 (first biasing unit) and the compression spring 117 (second biasing unit). Thus, the responsiveness can be further enhanced. The piezoelectric element and the first biasing unit are arranged in parallel. Accordingly, the spring force (biasing force) is generated depending on the shape of the piezoelectric element, so that the movement (displacement) of the piezoelectric element and the biasing force can be fully synchronized and assisted.

Figure 9:
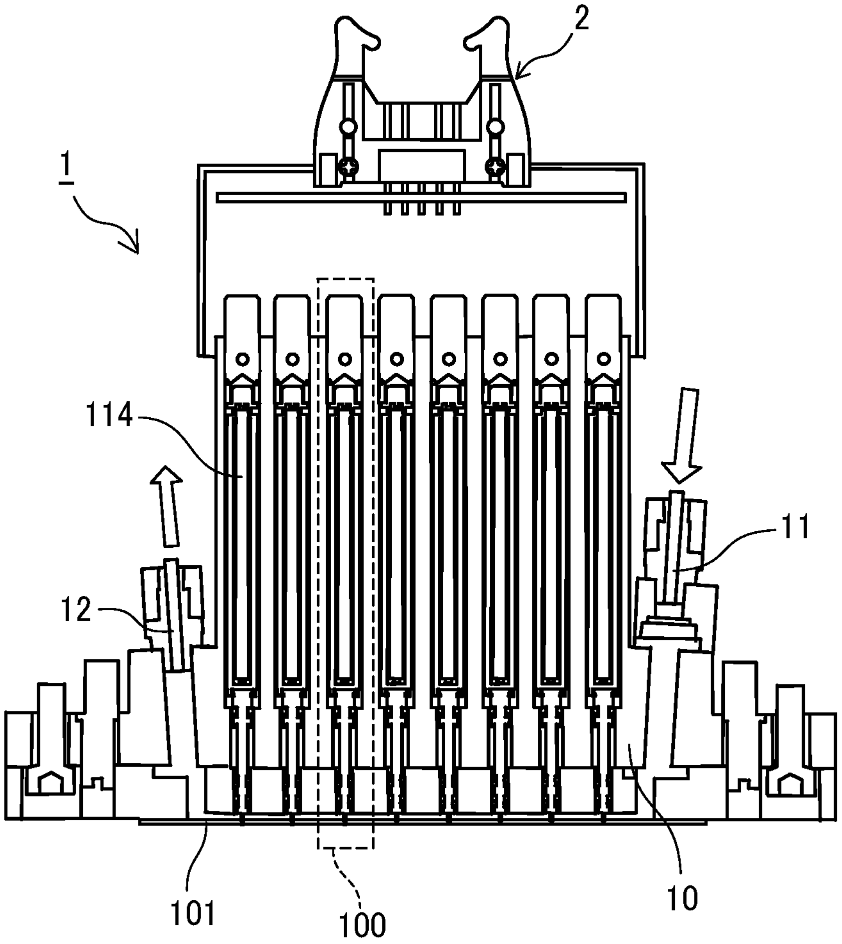
FIG. 9 is a cross-sectional view of a discharge head according to a fifth embodiment of the present disclosure.
Figure 10:
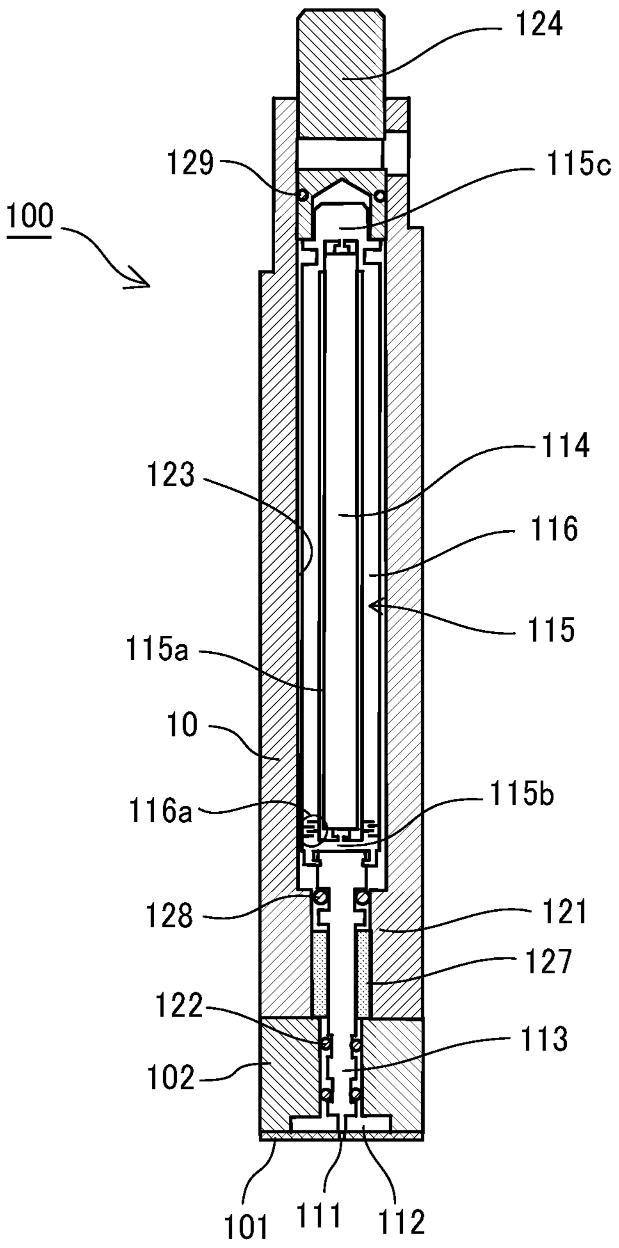
FIG. 10 is a cross-sectional view of one discharge module of the discharge head of FIG. 9.

Next, a fifth embodiment of the present disclosure is described with reference to FIGS. 9 and 10. FIG. 9 is a cross-sectional view of a discharge head according to the fifth embodiment. FIG. 10 is a cross-sectional view of one discharge module of the discharge head of FIG. 9.

A discharge head 1 according to the present embodiment includes a plurality of discharge modules 100 arranged in one row or a plurality of rows in a housing 10 and a channel member 102. Pressurized liquid is supplied to each discharge module 100 from the outside via a supply port 11, and liquid that is not discharged is collected to the outside via a collection port 12. The housing 10 is provided with a connector 2.

The discharge module 100 includes a nozzle plate 101, a channel member 102, a valve body 113, and a piezoelectric element 114. A nozzle 111 that discharges liquid is formed in the nozzle plate 101. The channel member 102 forms a channel 112 that supplies pressurized liquid to the nozzle 111. The valve body 113 has a needle-shape and opens and closes the nozzle 111. The piezoelectric element 114 drives the valve body 113.

The nozzle plate 101 and the channel member 102 are bonded together. The channel 112 is a channel common to the plurality of discharge modules 100 formed in the channel member 102. As described above, the pressurized liquid is supplied through the supply port 11, and the liquid is collected from the collection port 12.

An elastic body 113*a* is provided at a tip end portion of the valve body 113 and reliably closes the nozzle 111 when the elastic body 113*a* is pressed against the nozzle plate 101.

A slide bearing 127 as a guide member to guide the movement of the valve body 113 is disposed between the valve body 113 and the housing 10. Guiding the movement of the valve body 113 by the slide bearing 127 can restrain the deviation of the central axis between the valve body 113 and the nozzle 111 and reduce curved discharge.

A seal member 122 is provided between the valve body 113 and the channel member 102.

The piezoelectric element 114 is accommodated in a piezoelectric-element housing space 123 of the housing 10. The piezoelectric element 114 is held in a central space 115*a* of a holding member 115 also serving as a first biasing unit. The piezoelectric element 114 and the valve body 113 are coaxially coupled to each other via a front end portion 115*b* of the holding member 115.

The holding member 115 has the central space 115*a* to accommodate the piezoelectric element 114. A front end portion 115*b* side of the holding member 115 is coupled to the valve body 113, and a rear end portion 115*c* side of the holding member 115 is fixed by a piezoelectric-element fixing shaft 124 attached to the housing 10.

The holding member 115 includes a holding plate spring 116 as a first biasing unit. In the present embodiment, the holding plate spring 116 has an elastically deformable spring portion 116*a* only on one end portion side (i.e. the side to which the valve body 113 is attached) in the longitudinal direction corresponding to an expansion/contraction direction of the piezoelectric element 114.

The length of the central space 115*a* of the holding member 115 in the axial direction of the valve body 113 is shorter than the length of the piezoelectric element 114 in the axial direction of the valve body 113. Accordingly, when the piezoelectric element 114 is fitted into the central space 115*a* of the holding member 115, the spring portion 116*a* of the holding plate spring 116 is extended.

As a result, when the piezoelectric element 114 is contracted, the holding plate spring 116 is also contracted. Thus, a biasing force in a direction of pulling the valve body 113 (in other words, a direction of separating the valve body 113 from the nozzle 111) acts on the valve body 113.

Here, the piezoelectric element 114 operates in the D31 mode in which the piezoelectric element 114 contracts in a direction to open the valve body 113 when a voltage is applied to the piezoelectric element 114.

Accordingly, when no voltage is applied to the piezoelectric element 114, the valve body 113 closes the nozzle 111. Thus, even if the pressurized liquid is supplied to the channel 112, the liquid is not discharged from the nozzle 111.

When a voltage is applied to the piezoelectric element 114, the piezoelectric element 114 contracts and pulls the valve body 113 via the holding member 115, so that the valve body 113 is separated from the nozzle 111 to open the nozzle 111. Accordingly, the pressurized liquid supplied to the channel 112 is discharged from the nozzle 111.

Further, an elastic member 128 such as an O-ring that seals between the valve body 113 and the housing 10 is disposed between the slide bearing 127 and the front end portion of the piezoelectric element 114 (the front end portion 115*b* of the holding member 115). In addition, an elastic member 129 such as an O-ring is disposed to seal between the piezoelectric-element fixing shaft 124 and the housing 10.

Accordingly, the piezoelectric-element housing space 123 housing the piezoelectric element 114 is shielded from the outside air, and the piezoelectric element 114 is protected from moisture.

Figure 11:
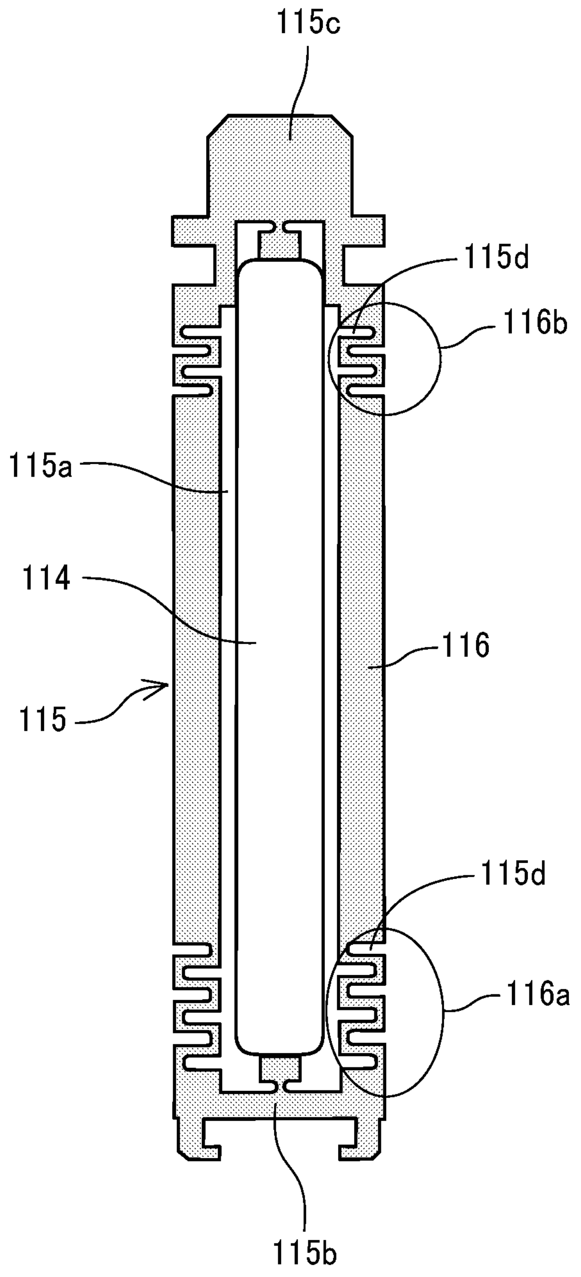
FIG. 11 is an enlarged view of a holding member of a discharge module according to a sixth embodiment of the present disclosure.

Next, a sixth embodiment of the present disclosure is described with reference to FIG. 11. FIG. 11 is an enlarged view of a holding member of a discharge module according to the sixth embodiment.

In the present embodiment, a holding plate spring 116 is provided with a spring portion 116*a* and a spring portion 116*b* at both end portions in a longitudinal direction of the holding plate spring 116. The spring constants of the spring portion 116*a* and the spring portion 116*b* are different from each other. Here, the number of slits 115*d* in the spring portion 116*a* on the side to which the valve body 113 is attached is set to four (two on each side), and the number of slits 115*d* in the spring portion 116*b* on the side opposite to the side to which the valve body 113 is attached is set to six (three on each side). Thus, the spring constants of the spring portion 116*a* and the spring portion 116*b* are made different.

As described above, since the spring constant is different between the spring portion 116*a* and the spring portion 116*b* provided at both end portions of the holding plate spring 116, the speed of displacement of the piezoelectric element 114 can be made different between the expansion side and the contraction side.

For example, the speed of contraction is increased by increasing the number of springs on the valve body 113 side, and the speed of expansion is increased by increasing the number of springs on the side opposite to the valve body 113 side.

Figure 12:
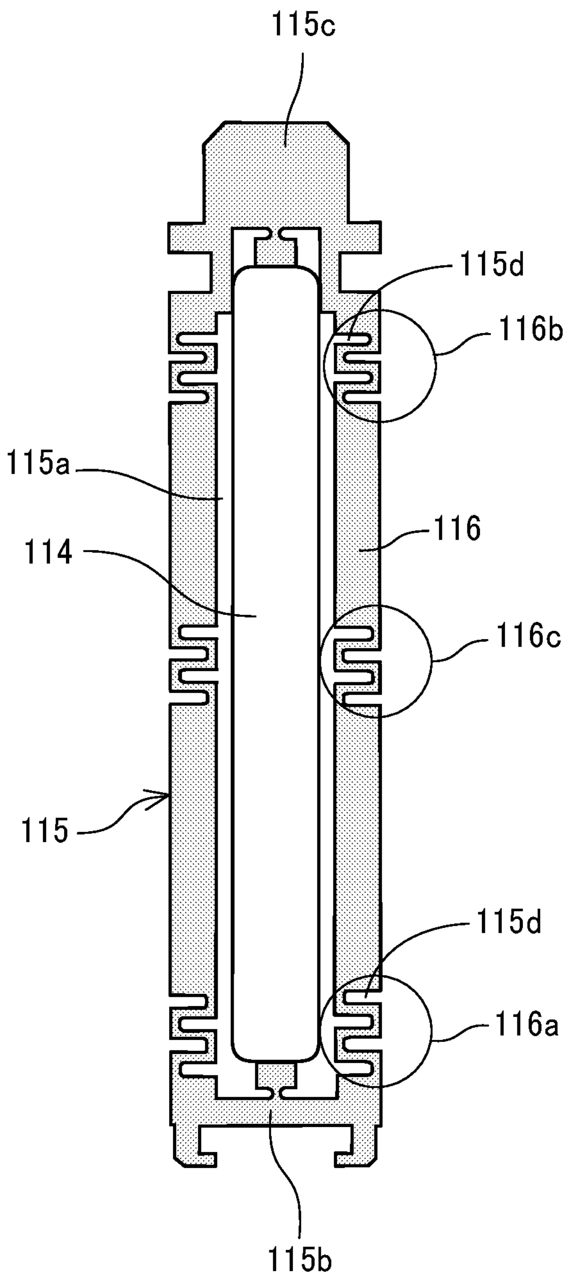
FIG. 12 is an enlarged view of a holding member of a discharge module according to a seventh embodiment of the present disclosure.

Next, a seventh embodiment of the present disclosure is described with reference to FIG. 12. FIG. 12 is an enlarged view of a holding member of a discharge module according to the seventh embodiment.

In the present embodiment, a holding plate spring 116 is provided with a spring portion 116*a* and a spring portion 116*b* at both end portions in a longitudinal direction of the holding plate spring 116 and is provided with a spring portion 116*c* at a central portion in the longitudinal direction. The configuration of the spring portion 116*c* is similar to the configuration of the spring portions 116*a* and 116*b*.

In this manner, the spring portions 116*a*, 116*b*, and 116*c* are provided at both end portions and the central portion of the holding plate spring 116. Thus, the entire holding plate spring 116 can be displaced, and the displacing force of the piezoelectric element 114 can be transmitted to the valve body 113 without waste.

Figure 13:
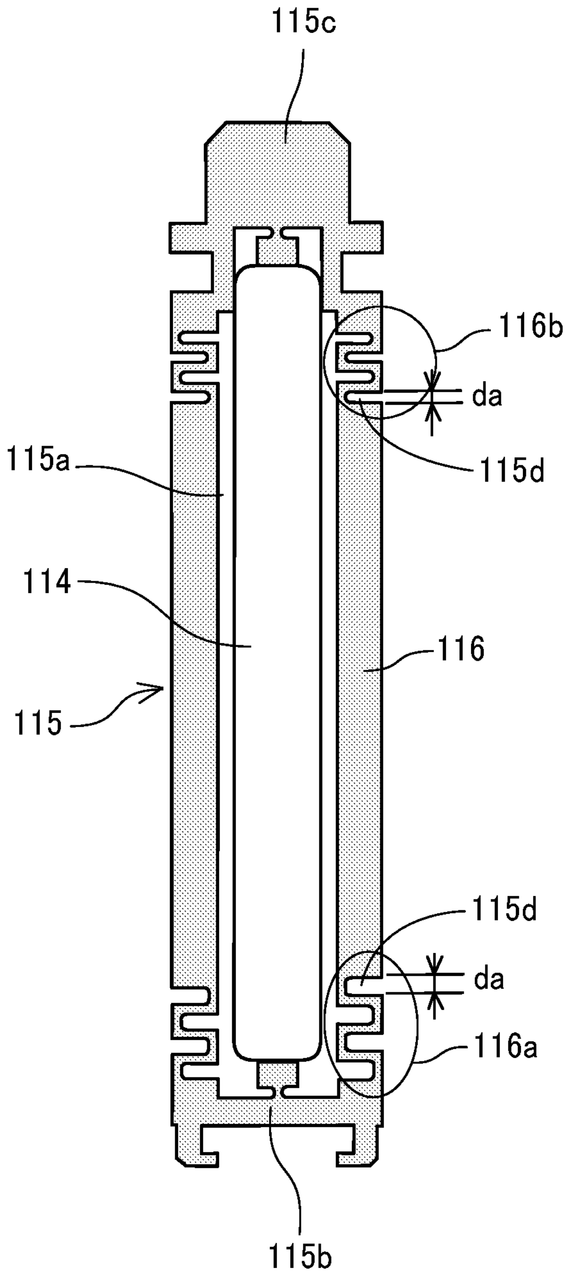
FIG. 13 is an enlarged view of a holding member of a discharge module according to an eighth embodiment of the present disclosure.

Next, an eighth embodiment of the present disclosure is described with reference to FIG. 13. FIG. 13 is an enlarged view of a holding member of a discharge module according to the eighth embodiment.

In the present embodiment, a holding plate spring 116 is provided with a spring portion 116*a* and a spring portion 116*b* at both end portions in a longitudinal direction of the holding plate spring 116. The spring constants of the spring portion 116*a* and the spring portion 116*b* are different from each other. Here, the interval da between the slits 115*d* of the spring portion 116*a* on the side to which the valve body 113 is attached is made wider than the interval db between the slits 115*d* of the spring portion 116*b* on the side opposite to the side to which the valve body 113 is attached. Thus, the spring constants of the spring portion 116*a* and the spring portion 116*b* are made different.

As described above, since the spring constant is different between the spring portion 116*a* and the spring portion 116*b* provided at both end portions of the holding plate spring 116, the speed of displacement of the piezoelectric element 114 can be made different between the expansion side and the contraction side.

Figure 14:
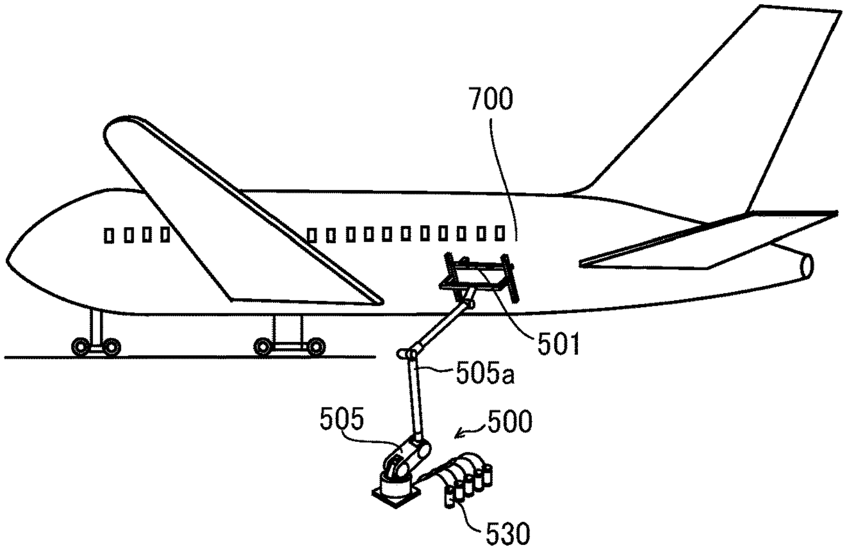
FIG. 14 is an illustration of a case in which an aircraft as a printing object is printed by a liquid discharge apparatus according to a ninth embodiment of the present disclosure.
Figure 15:
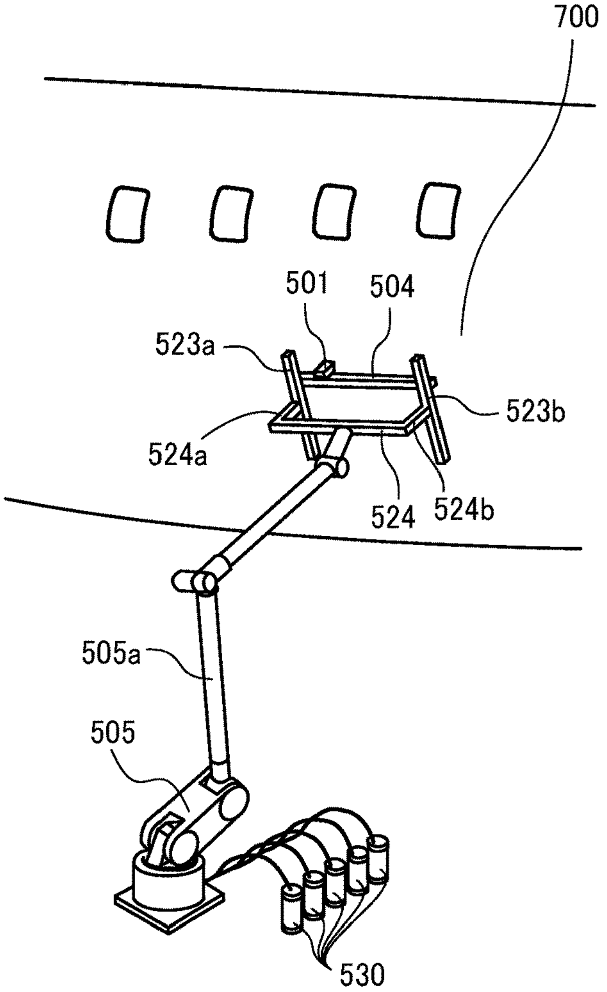
FIG. 15 is a perspective view of the liquid discharge apparatus of FIG. 14.

Next, a ninth embodiment of the present disclosure is described with reference to FIGS. 14 and 15. FIG. 14 is an illustration of a case in which an aircraft as a printing object is printed by a liquid discharge apparatus according to the ninth embodiment. FIG. 15 is a perspective view of the liquid discharging apparatus.

The liquid discharge apparatus 500 includes a linear rail 504 and an articulated robot 505. The linear rail 504 linearly reciprocates a carriage that is a moving body on which a discharge unit 501 including the discharge head 1 is mounted. The articulated robot 505 appropriately moves the linear rail 504 to a predetermined position and holds the linear rail 504 at the position.

The articulated robot 505 includes a robot arm 505*a* that can freely move like human arms by a plurality of joints, and can freely move a leading end of the robot arm 505*a* and locate the leading end at an accurate position.

As the articulated robot 505, for example, a six-axis control type industrial robot including six axes, in other words, six joints can be used. According to the six-axis control type articulated robot, the linear rail 504 can be placed to face a specified position of a printing object 700 (the aircraft in this example) very accurately and quickly by teaching the information on the operation in advance to the articulated robot. The robot 505 is not limited to six axes, and an articulated robot having an appropriate number of axes such as five axes or seven axes can be used.

The robot arm 505*a* of the robot 505 is provided with a fork-shaped support member 524 branched into two branches. A vertical linear rail 523*a* is attached to a tip of a left branch 524*a* of the support member 524 and a vertical linear rail 523*b* is attached to a tip of a right branch 524*b* so that the vertical linear rail 523*a* and the vertical linear rail 523*b* are parallel to each other.

Both ends of the linear rail 504 that movably holds the discharge unit 501 are supported so as to bridge the two vertical linear rails 523*a* and 523*b*.

The discharge unit 501 includes, for example, a plurality of discharge heads 1 that discharge liquids of different colors of black, cyan, magenta, yellow, and white, or a discharge head 1 having a plurality of nozzle arrays that discharge liquids of such different colors. Liquid of each color is supplied under pressure from a liquid tank 530 to each discharge head 1 of the discharge unit 501 or each nozzle array of the discharge head 1.

In the liquid discharge apparatus 500, the linear rail 504 is moved by the robot 505 to a position facing a desired printing area of the printing object 700. The liquid discharge apparatus 500 performs printing by driving the piezoelectric element 114 (or the piezoelectric element 134) of each discharge module 100 of the discharge head 1 while moving the discharge unit 501 along the linear rail 504 according to the print data.

When printing of one line is completed, the vertical linear rails 523*a* and 523*b* are driven to move the discharge head 1 of the discharge unit 501 from one line to the next line.

By repeating this operation, printing can be performed in a desired printing area of the printing object 700.

Figure 16:
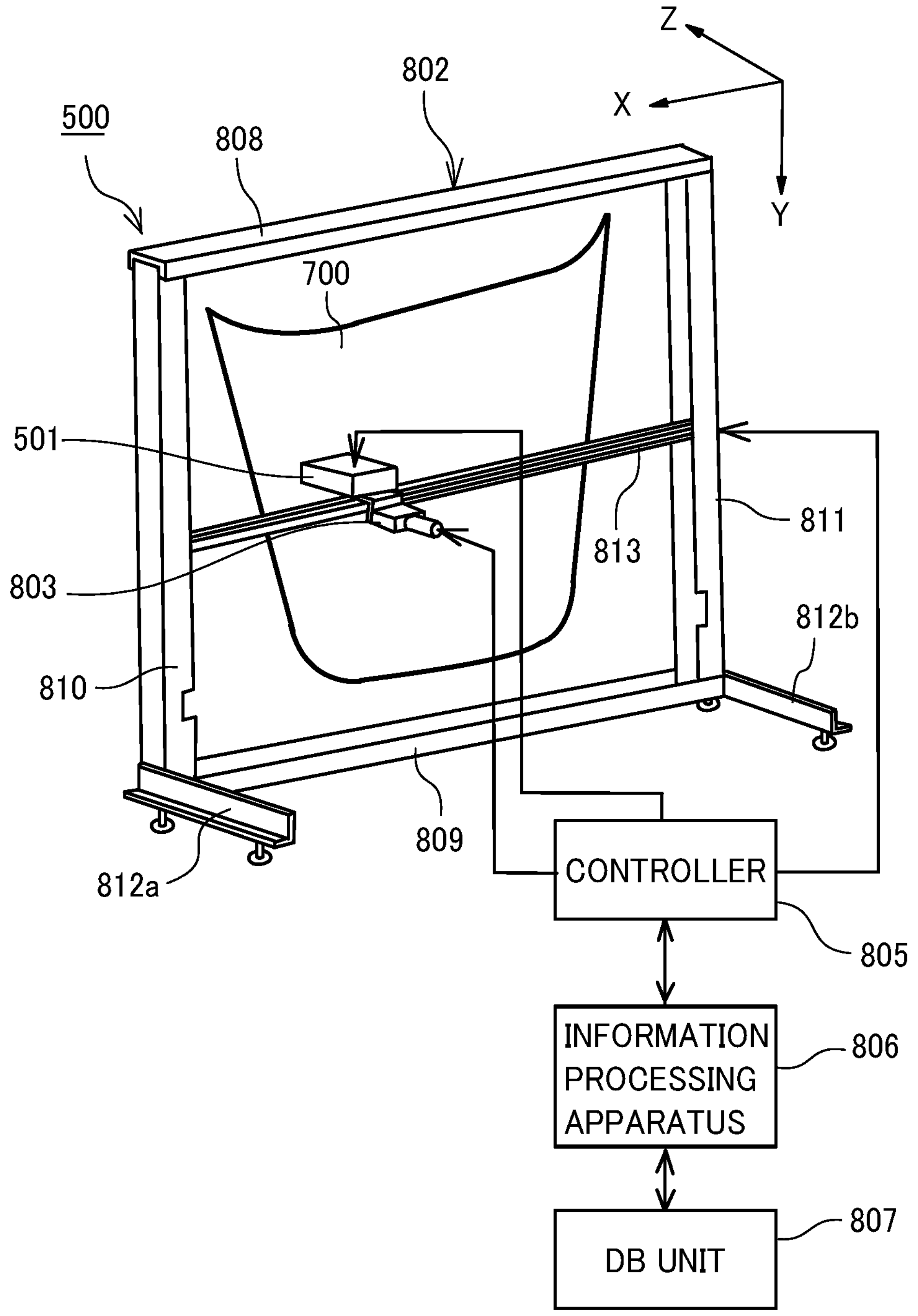
FIG. 16 is a perspective view of a liquid discharge apparatus according to a tenth embodiment of the present disclosure.
Figure 17:
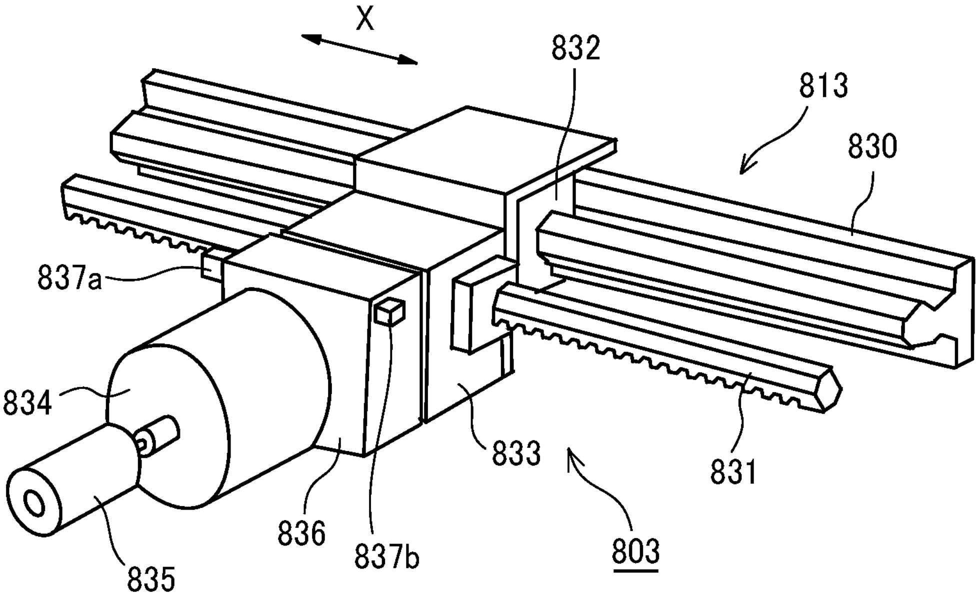
FIG. 17 is a perspective view of a drive unit of the liquid discharge apparatus of FIG. 16.

Next, a tenth embodiment of the present disclosure is described with reference to FIGS. 16 and 17. FIG. 16 is a perspective view of a liquid discharge apparatus according to the tenth embodiment. FIG. 17 is a perspective view of a drive unit of the liquid discharge apparatus.

A liquid discharge apparatus 500 according to the present embodiment includes a movable frame unit 802 installed to face a printing object 700 having a curved surface such as a hood of a vehicle. A movable unit 813 is attached to a right frame member 811 and a left frame member 810 constituting a frame unit 802 so as to be bridged between the right frame member 811 and the left frame member 810. The movable unit 813 can elevate up and down in the vertical direction (i.e., a direction indicated by arrow Y in FIG. 16).

The movable unit 813 is provided with a drive unit 803 and a discharge unit 501. The drive unit 803 has a built-in motor and can reciprocate in a horizontal direction (i.e., a direction indicated by arrow X in FIG. 16) on the movable unit 813. The discharge unit 501 is attached to the drive unit 803 and discharges liquid toward the printing object 700.

The liquid discharge apparatus 500 also includes a controller 805 that controls discharge of liquid from the discharge unit 501, reciprocating movement of the drive unit 803, and elevation of the movable unit 813, and an information processing apparatus 806 such as a personal computer (PC) that issues instructions to the controller 805. The information processing apparatus 806 is connected to a database unit (DB unit) 807 that records and stores information on the printing object 700 such as a shape and a size.

The frame unit 802 includes an upper frame member 808, a lower frame member 809, the right frame member 811, and the left frame member 810 that are formed of metallic columnar bodies or the like. The frame unit 802 further includes a right leg member 812*b* and a left leg member 812*a* that are attached at right angles and horizontally to both sides of the lower frame member 809 in order to cause the frame unit 802 stand by itself.

The movable unit 813 bridged between the right frame member 811 and the left frame member 810 is configured to elevate up and down while supporting the drive unit 803.

The printing object 700 is disposed perpendicular to a liquid discharge direction (indicated by arrow Z in FIG. 16), in other words, so as to face a plane formed by the upper frame member 808, the lower frame member 809, the right frame member 811, and the left frame member 810 of the frame unit 802.

In such a case, in order to locate the printing object 700 at a predetermined position at which printing is to be performed, for example, the back side of a printing area of the printing object 700 can be sucked and held by a chuck attached to a leading end of an arm of an articulated arm robot. Using the articulated arm robot allows the printing object 700 to be accurately located at the printing position and the posture of the printing object 700 to be accurately changed.

As illustrated in FIG. 17, the drive unit 803 is disposed so as to be reciprocatingly movable in the horizontal direction (X direction) on the movable unit 813. The movable unit 813 includes a rail 830, a rack gear 831, a linear guide 832, a pinion gear unit 833, a motor 834, and a rotary encoder 835. The rail 830 horizontally extends between the right frame member 811 and the left frame member 810 of the frame unit 802. The rack gear 831 is disposed parallel to the rail 830. The linear guide 832 is externally fitted to a part of the rail 830 so as to be movable while sliding. The pinion gear unit 833 is connected to the linear guide 832 and meshed with the rack gear 831. The motor 834 is provided with a reduction gear 836 and rotationally drives the pinion gear unit 833. The rotary encoder 835 detects a printing point position.

Driving the motor 834 (to rotate forward or reverse) causes the discharge unit 501 to move in the right direction or the left direction along the movable unit 813. The drive unit 803 functions as a driving mechanism of the discharge unit 501 in the X direction. Limit switches 37*a* and 37*b* are attached to both sides of a housing of the reduction gear 836.

The discharge unit 501 includes, for example, a plurality of discharge heads 1 that discharge liquids of different colors of black, cyan, magenta, yellow, and white, or a discharge head 1 having a plurality of nozzle arrays that discharge liquids of such different colors. Liquid of each color is supplied under pressure from a liquid tank to each discharge head 1 of the discharge unit 501 or each nozzle array of the discharge head 1.

In the liquid discharge apparatus 500, the movable unit 813 is moved in the Y direction and the discharge unit 501 is moved in the X direction to print a desired image on the printing object 700.

Figure 18:
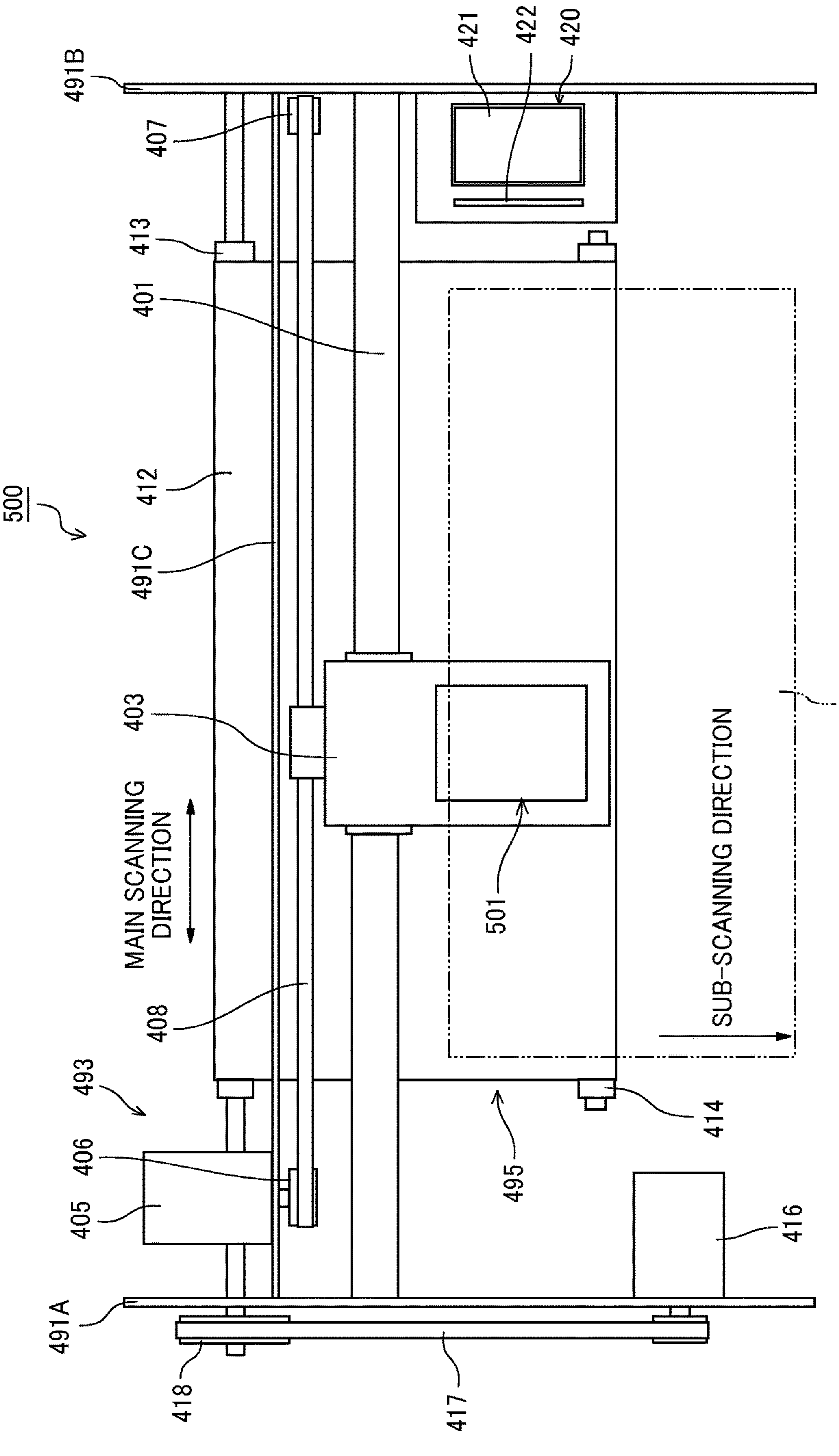
FIG. 18 is a plan view of a main part of a liquid discharge apparatus according to an eleventh embodiment of the present disclosure.
Figure 19:
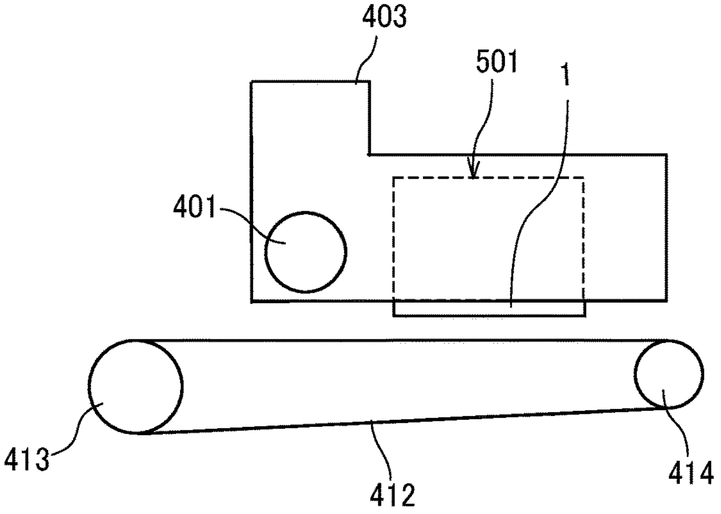
FIG. 19 is a side view of a main part of the liquid discharge apparatus of FIG. 18.

Next, an eleventh embodiment of the present disclosure is described with reference to FIGS. 18 and 19. FIG. 18 is an explanatory plan view of a main part of a liquid discharge apparatus according to the eleventh embodiment. FIG. 19 is a side view of the main part of the liquid discharge apparatus of FIG. 18.

A liquid discharge apparatus 500 according to the present embodiment is a serial type printing apparatus, and a carriage 403 reciprocates along main scanning directions by a main-scanning movement mechanism 493. The main-scanning moving mechanism 493 includes, e.g., a guide 401, a main-scanning motor 405, and a timing belt 408. The guide 401 is bridged between a right side plate 491B and a left side plate 491A to moveably hold the carriage 403. A main-scanning motor 405 reciprocates the carriage 403 in the main-scanning directions via the timing belt 408 bridged between a drive pulley 406 and a driven pulley 407.

A discharge unit 501 including the discharge head 1 according to an embodiment of the present disclosure is mounted on the carriage 403. The discharge head 1 of the discharge unit 501 discharges liquids of different colors, for example, yellow (Y), cyan (C), magenta (M), and black (K).

The liquid discharge apparatus 500 further includes a conveyance mechanism 495 to convey a sheet 410. The conveyance mechanism 495 includes a conveyance belt 412 serving as a conveyor and a sub-scanning motor 416 to drive the conveyance belt 412.

The conveyance belt 412 attracts the sheet 410 and conveys the sheet 410 to a position facing the discharge head 1. The conveyance belt 412 is an endless belt stretched between a conveyance roller 413 and a tension roller 414. The sheet 410 is attracted to the conveyance belt 412 by electrostatic force or air suction.

The conveyance belt 412 circumferentially moves in the sub-scanning direction as the conveyance roller 413 is rotationally driven by the sub-scanning motor 416 via a timing belt 417 and a timing pulley 418.

On one side of the carriage 403 in the main scanning direction, a maintenance mechanism 420 that maintains and recovers the discharge head 1 is disposed on a lateral side of the conveyance belt 412.

The maintenance mechanism 420 includes, for example, a cap 421 to cap a nozzle face (i.e., a face on which nozzles are formed) of the discharge head 1 and a wiper 422 to wipe the nozzle face.

The main-scanning moving mechanism 493, the maintenance mechanism 420, and the conveyance mechanism 495 are installed onto a housing including the side plates 491A and 491B and a back plate 491C.

In the liquid discharge apparatus 500 having the above-described configuration, the sheet 410 is fed and attracted onto the conveyance belt 412 and conveyed in the sub-scanning direction by the circumferential movement of the conveyance belt 412.

The discharge head 1 is driven in response to an image signal while moving the carriage 403 in the main scanning direction to discharge the liquid onto the sheet 410 not in motion, thereby recording an image.

Figure 20:
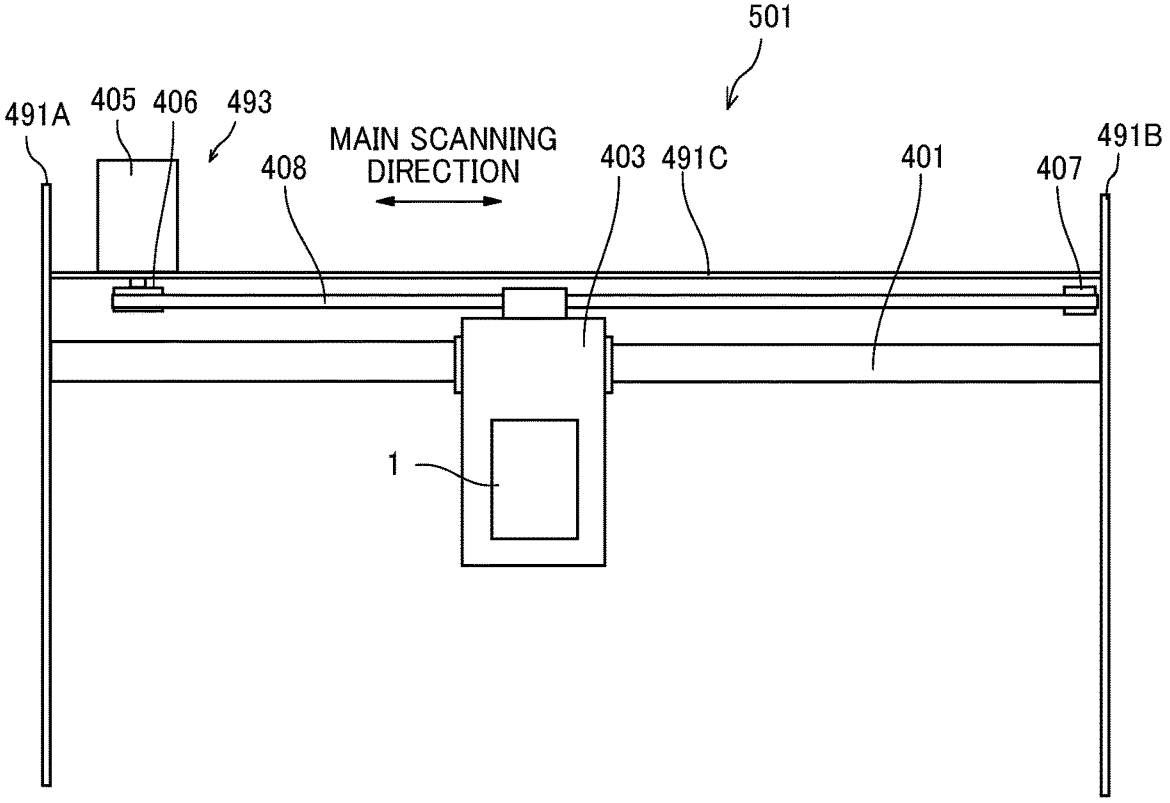
FIG. 20 is a plan view of a main part of a discharge unit according to an embodiment of the present disclosure.

Next, another example of the discharge unit is described with reference to FIG. 20. FIG. 20 is a plan view of a main part of another example of the discharge unit.

A discharge unit 501 illustrated in FIG. 20 includes a housing portion including the side plates 491A and 491B and the back plate 491C, the main-scanning moving mechanism 493, the carriage 403, and the discharge head 1, among the components or members of the printing apparatus 500 described above.

Note that a discharge unit may have a configuration in which the above-described maintenance mechanism 420 is further attached to, for example, the side plate 491B of the discharge unit 501.

Figure 21:
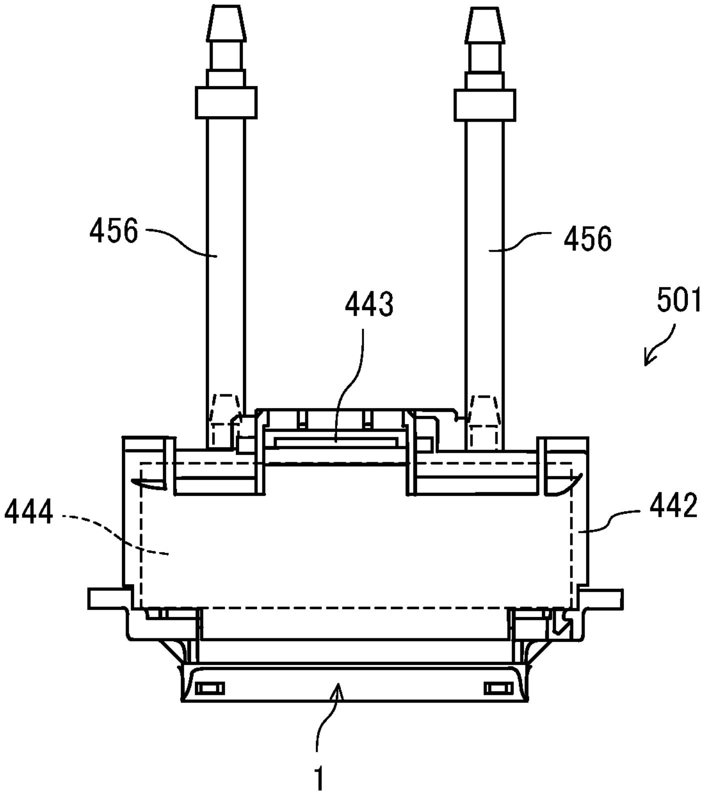
FIG. 21 is a front view of a discharge unit according to an embodiment of the present disclosure.

Next, still another example of the discharge unit is described with reference to FIG. 21. FIG. 21 is a front view of still another example of the discharge unit.

A discharge unit 501 illustrated in FIG. 20 includes a discharge head 1 to which a channel component 444 is attached, and a tube 456 connected to the channel component 444.

The channel component 444 is disposed inside a cover 442. A connector 443 for electrically connecting to the discharge head 1 is provided on the channel component 444.

In the present disclosure, the liquid to be discharged is not limited to a particular liquid as long as the liquid has a viscosity or surface tension to be discharged from a head (liquid discharge head). However, preferably, the viscosity of the liquid is not greater than 30 mPa s under ordinary temperature and ordinary pressure or by heating or cooling. Examples of the liquid include a solution, a suspension, or an emulsion that contains, for example, a solvent such as water and an organic solvent, a colorant such as dye and pigment, a functional material such as a polymerizable compound, a resin, and a surfactant, a biocompatible material such as deoxyribonucleic acid (DNA), amino acid, protein, and calcium, or an edible material such as a natural colorant. Such a solution, a suspension, and an emulsion are used for, e.g., inkjet ink, a surface treatment solution, a liquid for forming components of an electronic element and a light-emitting element or a resist pattern of an electronic circuit, or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and opposed electrodes.

The discharge unit is an integrated unit including the discharge head and a functional part(s) or unit(s) and is an assembly of parts relating to liquid discharge. Examples of the discharge unit include a combination of a discharge head with at least one of a head tank, a carriage, a supply mechanism, a maintenance mechanism, a main-scanning moving mechanism, and a liquid circulation device.

Herein, the terms "combined" or "integrated" mean attaching the discharge head and the functional parts (or mechanism) to each other by fastening, screwing, binding, or engaging and holding one of the discharge head and the functional parts to the other movably relative to the other. The discharge head, functional component, and mechanism may also be detachably attached to one another.

For example, the discharge head and the head tank are integrated as the discharge unit. Alternatively, the discharge head may be coupled with the head tank through a tube or the like to integrally form the discharge unit. Here, a unit including a filter may further be added to a portion between the head tank and the discharge head of the discharge unit.

Examples of the discharge unit further include discharge units in which a discharge head and a carriage are integrated.

Examples of the discharge unit include a discharge unit in which a discharge head is movably held on a guide member constituting part of a scanning movement mechanism, and the discharge head and the scanning movement mechanism are integrated. Examples of the discharge unit include discharge units in which a discharge head, a carriage, and a main-scanning moving mechanism are integrated as a single unit.

Examples of the discharge unit further include discharge units in which a discharge head, a carriage, and a maintenance mechanism are integrated in such a manner that the discharge head is mounted on the carriage and a cap of the maintenance mechanism is secured to the carriage.

Examples of the discharge unit further include discharge units in which tubes connected to a head tank or a discharge head mounted with a channel member so that the discharge head and a supply mechanism are integrated as a single unit. Through this tube, the liquid of the liquid storage source is supplied to the discharge head.

The main-scanning moving mechanism may be a guide only. The supply unit may be a tube(s) only or a loading unit only.

The term "liquid discharge apparatus" used herein also represents an apparatus including a head or a discharge unit to drive the head to discharge liquid. The liquid discharge apparatus may be, for example, an apparatus capable of discharging liquid to a material to which liquid can adhere or an apparatus to discharge liquid toward gas or into liquid.

The liquid discharge apparatus may include means relating to feeding, conveyance, and sheet ejection of the material to which liquid can adhere and also include a pretreatment apparatus and a post-processing apparatus.

The liquid discharge apparatus may be, for example, an image forming apparatus to form an image on a sheet by discharging ink, or a three-dimensional apparatus to discharge a molding liquid to a powder layer in which powder material is formed in layers, so as to form a three-dimensional article.

The liquid discharge apparatus is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material to which liquid can adhere" denotes, for example, a material or a medium to which liquid can adhere at least temporarily, a material or a medium to which liquid can attach and firmly adhere, or a material or a medium to which liquid can adhere and into which the liquid permeates. Specific examples of the "material to which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material to which liquid is adherable" includes any material to which liquid is adhered, unless particularly limited.

Examples of the material to which liquid can adhere include any materials to which liquid can adhere even temporarily, such as paper, thread, fiber, fabric, leather, metal, plastic, glass, wood, and ceramic.

The liquid discharge apparatus may be an apparatus to relatively move a discharge head and a material on which liquid can adhere. However, the liquid discharge apparatus is not limited to such an apparatus. For example, the liquid discharge apparatus may be a serial head apparatus that moves the discharge head or a line head apparatus that does not move the discharge head.

Examples of the liquid discharge apparatus further include a treatment liquid coating apparatus to discharge a treatment liquid to a sheet to coat the treatment liquid on a sheet surface to reform the sheet surface and an injection granulation apparatus in which a composition liquid including raw materials dispersed in a solution is discharged through nozzles to granulate fine particles of the raw materials.

The terms "image formation," "recording," "printing," "image printing," and "fabricating" used herein can be used synonymously with each other.

In the embodiments described above, examples of the present disclosure are described, and embodiments of the present disclosure are not limited to the configurations of the above-described embodiments. In particular, the specific shapes and numerical values of the respective parts and components illustrated in the respective embodiments are merely examples of embodiments of the present disclosure, and the technical scope of the present disclosure is not limited thereto. The present disclosure can be appropriately modified without departing from the technical idea described in the claims.

This patent application is based on and claims priority to Japanese Patent Application No. 2020-050474, filed on Mar. 23, 2020, and Japanese Patent Application No. 2020-171568, filed on Oct. 9, 2020, in the Japan Patent Office, the entire disclosure of each of which is hereby incorporated by reference herein.

REFERENCE SIGNS LIST

1 Discharge head
10 Housing
20 Frame member
21 Base member
100 Discharge module
101 Nozzle plate
102 Channel member
111 Nozzle
112 Liquid chamber
113 Valve body
114 Piezoelectric element
115 Holding member
116 Holding plate spring (first biasing unit)
117 Compression spring (second biasing unit)
118 Displacement plate
123 Piezoelectric-element housing space
200, 201, 202 Voltage application units
500 Liquid discharge apparatus
501 Discharge unit
700 Printing object

The invention claimed is:

1. A discharge head, comprising:
a nozzle to discharge liquid;
a valve body to open and close the nozzle;
a piezoelectric element to drive the valve body;
a structure to displace the piezoelectric element and the valve body in a direction to close the nozzle; and
a first biasing structure having two end portions,
wherein the piezoelectric element is to drive the valve body in the direction to close the nozzle when a voltage is applied,
wherein the first biasing structure includes an elastically deformable spring portion at each of the two end portions in a direction in which the piezoelectric element extends or contracts,
wherein the elastically deformable spring portions each include a plurality of slits,
wherein the elastically deformable spring portions have different spring constants,
wherein the plurality of slits of each of the elastically deformable spring portions are provided alternatively along the direction in which the piezoelectric element extends or contracts such that the elastically deformable spring portions each have an s-shape,
wherein the first biasing structure includes a rigid portion disposed between the elastically deformable spring portions, wherein a first one of the elastically deformable spring portions is disposed at a first end of the rigid portion, wherein a second one of the elastically deformable spring portions is disposed at a second end of the rigid portion, wherein a length in the direction in which the piezoelectric element extends or contracts from the first end of the rigid portion to the second end of the rigid portion is longer than at least two times a total length of one of the first one of the elastically deformable spring portions or the second one of the elastically deformable spring portions in the direction in which the piezoelectric element extends or contracts, wherein the rigid portion has consistent rigidity and cross section from the first end of the rigid portion to the second end of the rigid portion along the direction in which the piezoelectric element extends or contracts, wherein, in response to expansion and contraction of the piezoelectric element, the elastically deformable spiring portions are deformable along the direction in which the piezoelectric element extends or contracts, and wherein, with respect to the expansion and contraction of the piezoelectric element, the rigid portion is rigid in the direction in which the piezoelectric element extends or contracts.

2. The discharge head according to claim 1, wherein the first biasing structure is disposed side by side with the piezoelectric element in the direction in which the piezoelectric element extends or contracts, and wherein the first biasing structure is to bias the valve body in the direction to open the nozzle.

3. The discharge head according to claim 1, further comprising:

a second biasing structure disposed in in an area extending from the piezoelectric element along the direction in which the piezoelectric element extends or contracts, wherein the second biasing structure is to bias the valve body in the direction to close the nozzle.

4. The discharge head according to claim 1, further comprising:

a guide member to guide movement of the valve body.

5. The discharge head according to claim 1, further comprising:

a channel to which pressurized liquid is supplied, the channel being communicated with the nozzle; and a displacement plate partitioning between the piezoelectric element and the channel, wherein the displacement plate is to displace with movement of the valve body.

6. A discharge unit, comprising:

the discharge head according to claim 1.

7. A liquid discharge apparatus, comprising:

the discharge unit according to claim 6.

8. A liquid discharge apparatus, comprising:

the discharge head according to claim 1.

9. The discharge head according to claim 1, wherein a number of the plurality of slits at a first end portion of the end portions is different from a number of the plurality of slits at a second end portion of the end portions.

10. The discharge head according to claim 1, wherein a distance between two slits of the plurality of slits at a first end portion of the end portions is different from a distance between two slits of the plurality of slits at a second end portion of the end portions.

11. The discharge head according to claim 1, wherein the first biasing structure is a plate spring.

12. The discharge head according to claim 1, wherein the first biasing structure includes two parallel plate portions which extend in the direction in which the piezoelectric element extends or contracts, wherein each of the two parallel plate portions has two end portions, wherein each of the two parallel plate portions includes an elastically deformable spring portion at each of the two end portions, and wherein the piezoelectric element is disposed between the two parallel plate portions.

13. The discharge head according to claim 1, wherein the rigid portion is a plate.

14. The discharge head according to claim 1, wherein the rigid portion has a uniform width from the first end of the rigid portion to the second end of the rigid portion along the direction in which the piezoelectric element extends or contracts.

15. The discharge head according to claim 1, wherein the length in the direction in which the piezoelectric element extends or contracts from the first end of the rigid portion to the second end of the rigid portion is longer than at least three times the total length of one of the first one of the elastically deformable spring portions or the second one of the elastically deformable spring portions in the direction in which the piezoelectric element extends or contracts.

16. The discharge head according to claim 1, wherein the length in the direction in which the piezoelectric element extends or contracts from the first end of the rigid portion to the second end of the rigid portion is longer than at least four times the total length of one of the first one of the elastically deformable spring portions or the second one of the elastically deformable spring portions in the direction in which the piezoelectric element extends or contracts.

17. The discharge head according to claim 1, wherein the length in the direction in which the piezoelectric element extends or contracts from the first end of the rigid portion to the second end of the rigid portion is longer than at least five times the total length of one of the first one of the elastically deformable spring portions or the second one of the elastically deformable spring portions in the direction in which the piezoelectric element extends or contracts.

* * * * *